(12) United States Patent
McKeighen (10) Patent No.: US 6,514,618 B1
(45) Date of Patent: Feb. 4, 2003

(54) MULTILAYER BACKING MATERIAL FOR 2-D ULTRASONIC IMAGING ARRAYS

(75) Inventor: Ron McKeighen, Phoenix, AZ (US)

(73) Assignee: Acoustic Imaging Technologies Corp., Phoenix, AZ (US)

( * ) Notice: Subject to any disclaimer, the term of this patent is extended or adjusted under 35 U.S.C. 154(b) by 0 days.

(21) Appl. No.: 09/500,188

(22) Filed: Feb. 7, 2000

Related U.S. Application Data (63) Continuation-in-part of application No. 09/435,282, filed on Nov. 5, 1999, now abandoned.
(60) Provisional application No. 60/107,296, filed on Nov. 6, 1998.

(51) Int. Cl.[7] .......................... B32B 27/38; H04R 17/00
(52) U.S. Cl. ........................ 428/413; 367/162; 367/176
(58) Field of Search ......................... 428/413; 310/327; 367/162, 176

(56) References Cited

U.S. PATENT DOCUMENTS 5,648,942 A * 7/1997 Kunkel, III .................. 310/327
5,947,905 A * 9/1999 Hadjicostis et al. ......... 600/463

OTHER PUBLICATIONS

Bechtold, et al., "A 2–D Acoustic Array for Diagnostic Imaging", 1996 IEEE Ultrasonics Symposium, Jan. 1996, pp. 1573–1576.

Bureau, et al., "A Two–Dimensional Transducer Array For Real–Time 3D Medical Ultrasound Imaging", 1998 IEEE Ultrasonics Symposium, Jul. 1998, pp. 1065–1068.

Daane, et al., "A Demountable 50×50 Paid Grid Array Interconnect System", SPIE, vol. 3037, 1997, pp. 124–128.

Davidsen, et al., "Two–Dimensional Arrays for Medical Ultrasound Using Multilayer Flexible Circuit Interconnection", IEEE Transactions on Ultrasonics, Ferroelectrics, and Frequency Control, vol. 45, No. 2, Mar. 1998, pp. 338–348.

Smith, et al., "Two–Dimensional Arrays for Medical Ultrasound", 1991 Ultrasonics Symposium, Jul. 1991, pp. 625–627.

* cited by examiner

*Primary Examiner*—Michael J Feely
(74) *Attorney, Agent, or Firm*—King & Spalding (57) ABSTRACT

A multilayer backing for an ultrasonic transducer array comprises at least two layers in contact with each other. The first layer is formed from a first composition comprising an epoxy resin base and a powder. The second layer is formed from a second composition comprising an epoxy resin base, a powder, and at least one of a phenolic shell micro-balloon and a plasticizer. The first layer is more rigid than the second layer so that the first layer provides mechanical support for the array, while the second layer provides maximal sound absorbance.

20 Claims, 12 Drawing Sheets

Overview of Process for forming a 2-D Ultrasonic Array

MULTILAYER BACKING MATERIAL FOR 2-D ULTRASONIC IMAGING ARRAYS

CROSS-REFERENCE TO RELATED APPLICATION

This application is a continuation-in-part of U.S. application Ser. No. 09/435,282, filed on Nov. 5, 1999, now abandoned, which claims priority of U.S. Provisional Application No. 60/107,296, filed on Nov. 6, 1998, the entire disclosures of which are incorporated herein by reference.

BACKGROUND OF THE INVENTION

The field of medical ultrasonic imaging traditionally uses a linear array of elements (flat or in a convex geometry) to scan a two dimensional image of organs of the body. Arrays deposed of large numbers of very tiny elements are needed in a two dimensional arrangement, so that the acoustic beam can arbitrarily be steered in all directions to achieve three dimensional images of organs, such as the heart, at high frame rates. The acquired data can then be displayed in two dimensional slices by off line processing, taken from arbitrary, user determined, slices through the organ.

The goal is to have high density arrays, "1.5 D" (elevation focusing and aberration correction processing) and 2-D arrays (3-D imaging), with fine pitch elements in both the horizontal and vertical directions, with fine pitch (0.25 to 2.0 wavelengths). Typical 2-D arrays have upwards of 50×50 elements. There are several obstacles to achieving this type of resolution. There is a lack of available working space and constraints on the ease of bringing signal leads out of the sides of the array. Because of these constraints, a more desirable way of bringing signal leads out of the array involves individual connection directly behind each element, where backing layers are present. Thus, electrically contacting the elements has to be done through the backing mass itself.

One prior method of constructing a two dimensional ultrasonic array requires drilling holes in an epoxy block to line up lead wires behind the array elements, and using silver epoxy to make electrical contact. This process typically is very time consuming, and therefore is not feasible for volume production of a commercial product.

Another technique entails the use of copper/beryllium etched wires, strung out and tensioned by special apparatus. The spacing of the leads to align with the array elements was achieved by a combination of spacer plates and mechanical tensioning devices. The leads were buried in the backing but terminated at the top surface of the backing block. This then required bulky attachment to a cable via various clamping means. This prototype was a bulky machine that was difficult for a clinician to hold between the patient and the scanning table to acquire the desired line of sight view of the organ being examined.

Aside from constructing the array of elements is the consideration of the materials used in the backing of the array. The backing typically has conflicting demands and requirements made on it. The backing must provide adequate mechanical support during the manufacture of the array, and this typically requires a stiffer, more rigid material. The backing must also absorb the acoustic energy coupled into the backing, so it must be highly attenuating, and this typically means softer durometer characteristics to increase visco-elastic damping. Backings are traditionally composed of powder loaded polymers, such as epoxy.

One object of the current invention is to provide a composition for a multi-element ultrasonic imaging array, and an economical means for fabricating the multi-element ultrasonic imaging array in volume for commercial purposes. Another object is to provide a staged backing for the transducer array which will impart both the necessary mechanical rigidity as well as the necessary acoustic absorbency required.

SUMMARY OF THE INVENTION

In one embodiment, the present invention is directed to a multilayer backing for an ultrasonic transducer array comprising at least two layers in contact with each other. The first layer is formed from a first composition comprising an epoxy resin base and a powder. The second layer is formed from a second composition comprising an epoxy resin base, a powder, and at least one of a phenolic shell micro-balloon and a plasticizer, preferably both a phenolic shell micro-balloon and a plasticizer. The first layer is more rigid than the second layer so that the first layer provides mechanical support for the array, while the second layer provides maximal sound absorbance. The multilayer backing can optionally contain a third layer in contact with the second layer. The third layer is formed from a third composition comprising an epoxy resin base and a powder, with the third layer being more rigid than the second layer. The third layer also provides mechanical support.

In another embodiment, the invention is directed to a method for making a backing for an ultrasonic transducer array. The method comprises setting a circuit into a mold. A first backing material composition, as described above, is poured into the mold to form a first layer. A second backing material composition, as described above, is poured into the mold to form a second layer in contact with the first layer. The first layer is more rigid than the second layer. The method can further include pouring a third backing material composition, as also described above, into the mold to form a third layer in contact with the second layer. The first backing material composition is cured, either before or after the second backing material is poured.

A more complete understanding of the backing material and method for its manufacture will be afforded to those skilled in the art, as well as a realization of additional advantages and objects thereof, by a consideration of the following detailed description.

DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
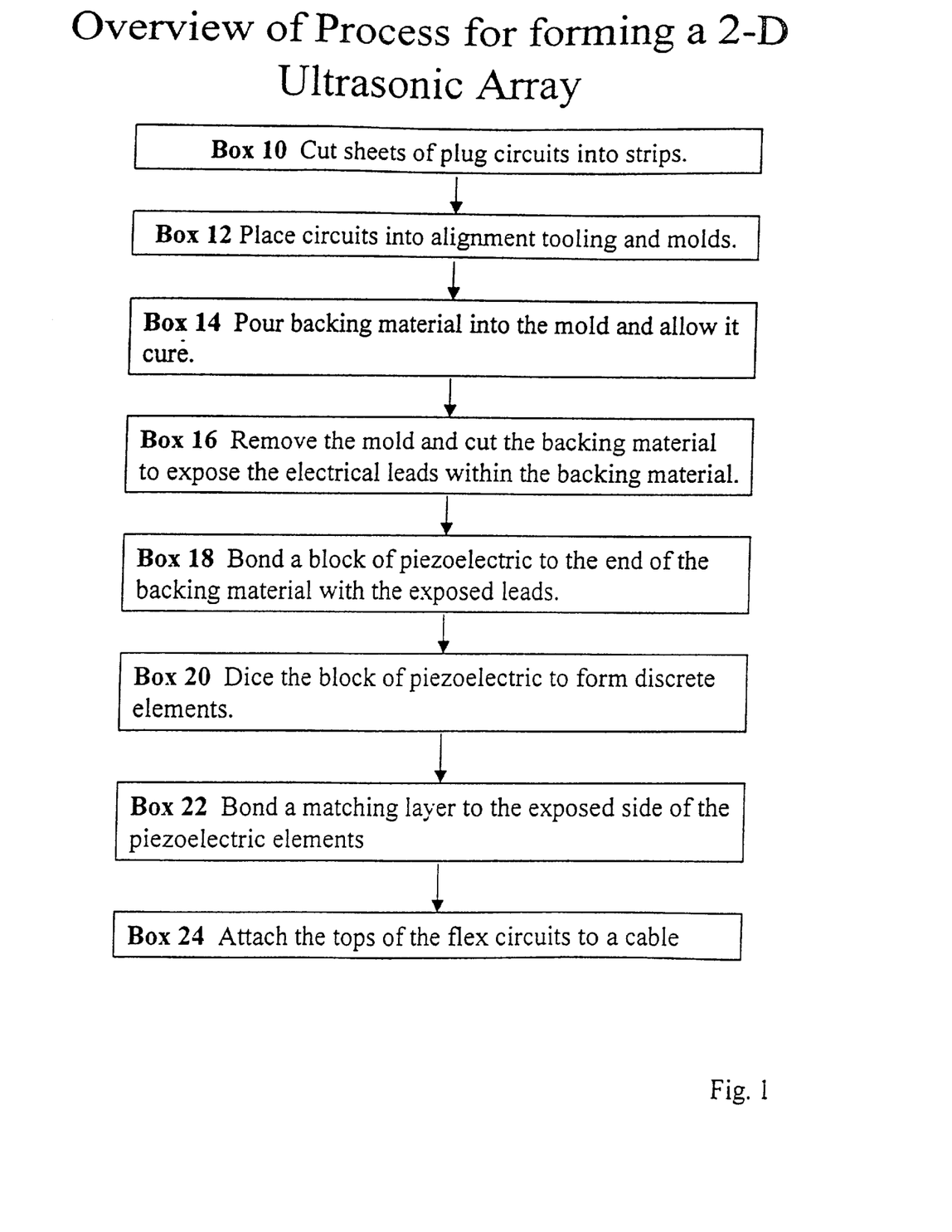
FIG. 1 is a flowchart of a preferred embodiment of the process of manufacturing a two dimensional ultrasonic imaging array in accordance with the present invention.

An exemplary 2-D ultrasonic imaging array is formed according to the following steps as shown in FIG. 1. Box 10 represents the first step of cutting a sheet of plug circuits into strips. Box 12 shows the second step of placing the plug circuits into alignment plates within a mold. Box 14 shows the third step of pouring backing material into the mold and allowing it to cure. Box 16 shows the fourth step of removing the mold and cutting the backing material to expose the electrical leads within the backing material. Box 18 shows the fifth step of bonding a block of piezoelectric ceramic material to the end of the backing material with the exposed leads. Box 20 shows the sixth step of dicing the block of piezoelectric ceramic material to form discrete elements. Box 22 shows the seventh step of bonding a matching layer to the exposed side of the piezoelectric ceramic elements. Box 24 shows the eighth step of attaching the top of the plug circuits to another device.

Figure 2:
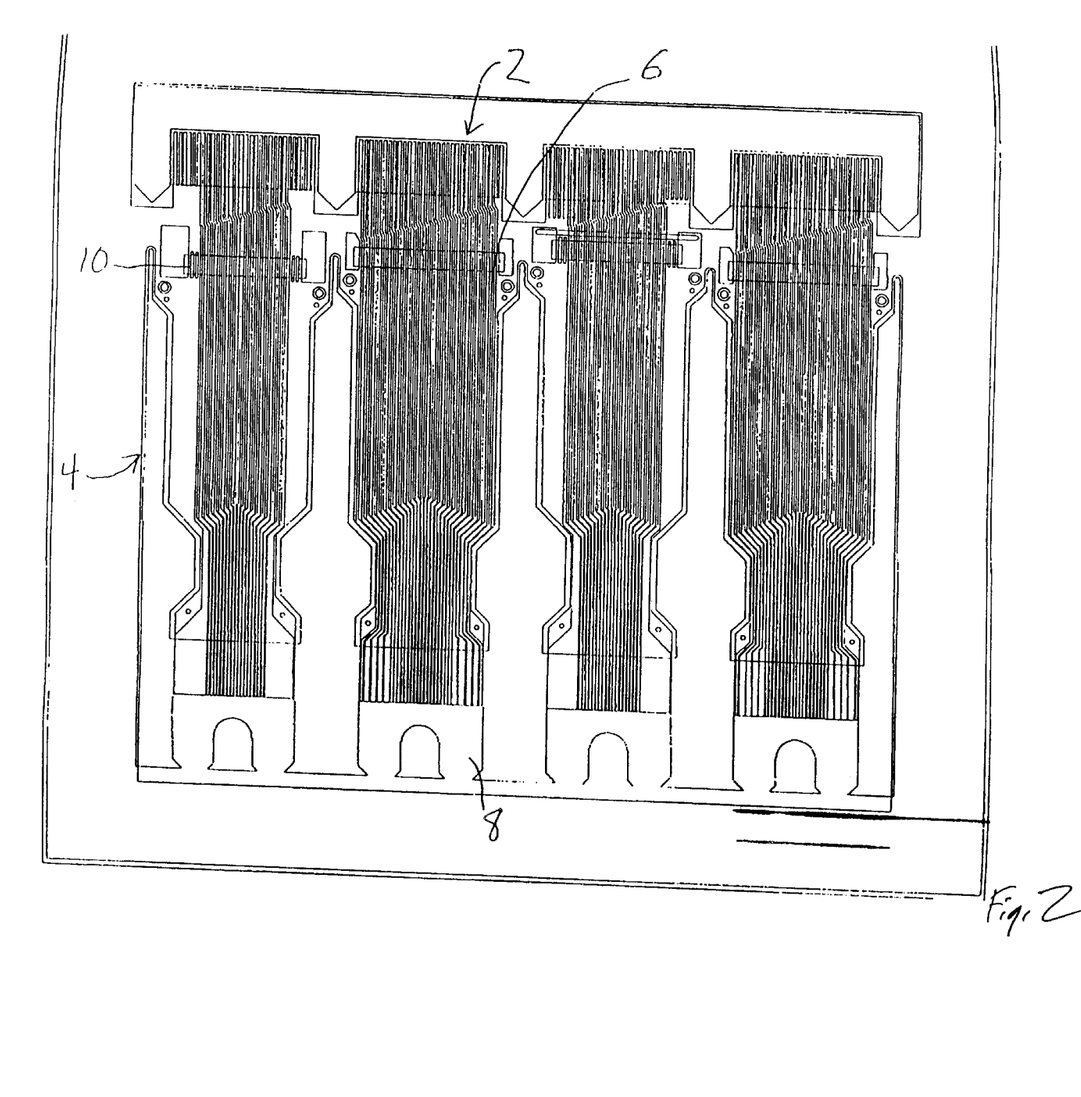
FIG. 2 is a front view of a sheet of lead attachment circuits (plug circuits).

More specifically, the first step in one embodiment of the process for forming a 2-D ultrasonic array is the acquisition of a lead attachment circuit 2 (plug circuit) as depicted in FIG. 2. In a preferred embodiment of the process, plug circuits 2 made of copper, or beryllium copper, etched on kapton are obtained in panels 4, such as those offered by Tech-Etch corporation. In another embodiment copper etched in polyimide or beryllium copper etched in polyimide is used. Kapton carrier film, or similar polymers, holds the electrical lead connections in precision alignment. The panel 4 is cut up to obtain individual plug circuits 2. Each plug circuit 2 has electrical lead traces 6 spanning its length, a "U" shaped section 8 on its bottom end and a window 10 on its top end, where the electrical leads are free of kapton.

As seen in FIG. 2, the windows 10 are all at different heights. The plug circuits 2 are organized by placing plug circuits 2 with higher windows toward the middle of the array and by placing plug circuits with lower windows 10 toward the periphery of the array to achieve a smooth gradation of window height. These window height differences are important later on, when the plug circuits 2 are cut into a staggered formation for ease of cable attachment and connection to other equipment as is described below.

Figure 3:
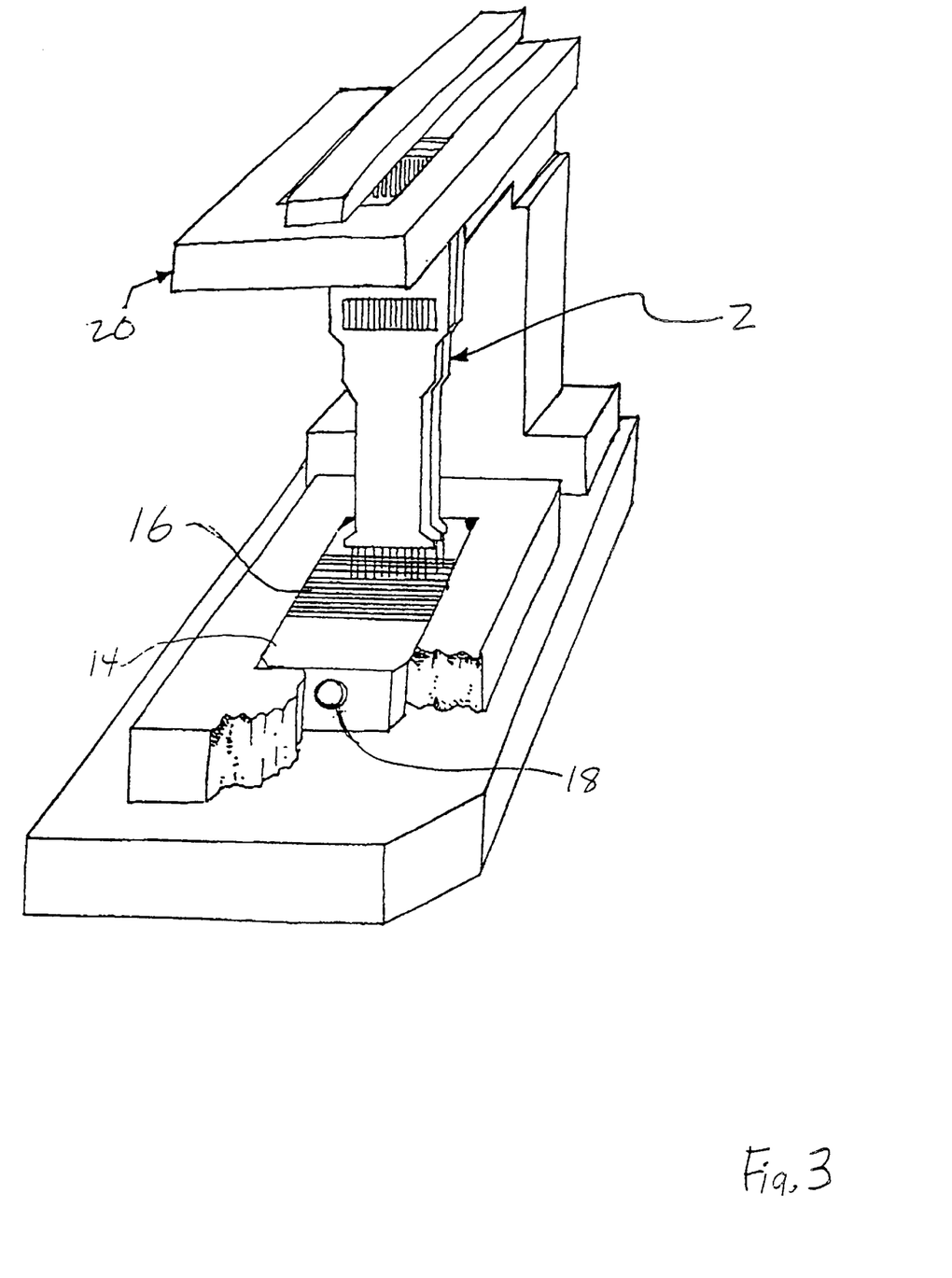
FIG. 3 is a front perspective view of the tooling apparatus and the masthead.
Figure 4:
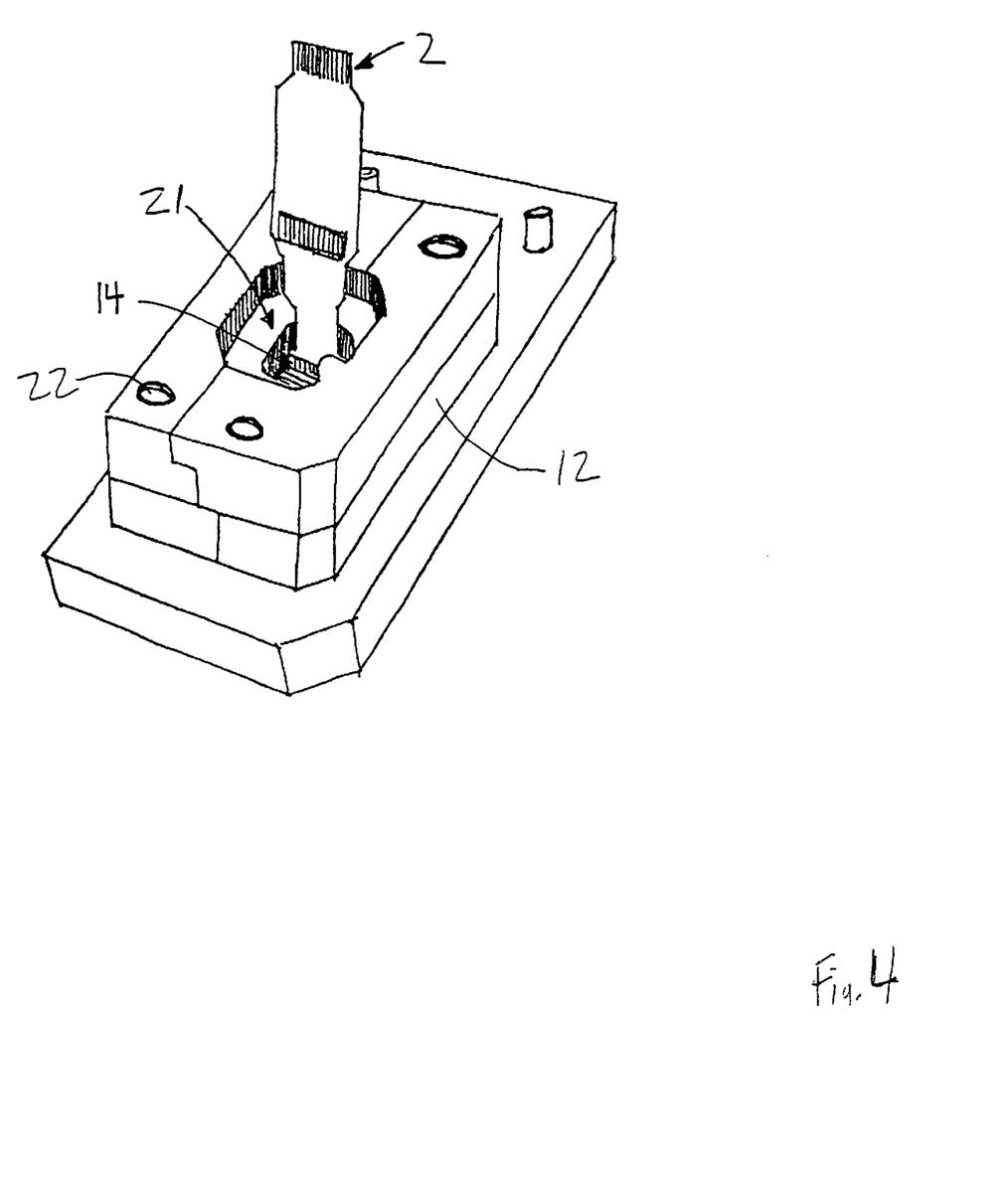
FIG. 4 is a front elevation showing the mold with the plug circuit inside.

The second step of the process is the alignment of the plug circuits 2 and the preparation of a backing mold 12, which is shown in FIGS. 3 and 4. As shown in FIG. 3, several plug circuits 2 are placed into an alignment tooling 14. In a preferred embodiment, the alignment tooling 14 is fabricated from aluminum and contains slot shaped holes 16 for the "U" shaped sections 8 to be inserted through. The holes 16 are diced into the aluminum with a dicing saw. Each plug circuit 2 is aligned in the tooling 14 by placing its "U" shaped section 8 through a hole 16 in the tooling 14 and over a dowel pin 18. The dowel pin 18 should have a shape which conforms to the bottom end section of whatever type of plug circuits 2 are being used. Additional pins may be used to help align and stabilize the circuits. The top end of each plug circuit 2 is placed into a masthead 20 for stability and positioning.

As shown in FIG. 4, after both ends of each plug circuit 2 are secured, a backing mold 12 is secured around the tooling 14. In a preferred embodiment of the present invention, a single mold 12 having a cavity 21 is used to shape the backing material. Multiple backing molds 12, each having a different shaped cavity 21 may be used to create different shapes, depending on the application, as will be appreciated by those skilled in the art. In a preferred embodiment, the mold 12 is made of aluminum, although both the mold and the tooling may be fabricated using machinable ceramic or metal as well as engineering plastic. The mold 12 can be made in pieces and held in place with pins 22 or any other suitable fastener, such as shoulder screws, to help remove the mold 12 and facilitate its reuse.

The third step of the process is the pouring of a backing material into the mold cavity 21. As shown in FIG. 4, after the mold 12 is in place around the tooling 14, the backing material 24 is poured into the mold cavity 21 around the plug circuits 2. The tooling 14 is used to hold the pitch and spacing of the plug circuits 2 with precision in an area of the backing block 24 that will later be positioned right behind the piezoelectric elements.

In one embodiment, the backing material 24 is formed of a single layer of a backing material composition containing a generally uniform mixture of at least one sound absorbing agent We in an epoxy resin base. In a preferred embodiment, the epoxy is heavily loaded with powders to tailor its acoustic properties. More particularly, heavy powders such as tungsten or metal oxides are included to scatter the sound, and to raise the density to a desired level. Additionally, phenolic shell micro-balloons, such as those commercially available from Union Carbide, are preferably added to scatter the sound and absorb the sound energy in the backing 24.

The backing material composition preferably further includes one or more plasticizing agents, such as liquid polysulfide, to make the backing 24 more elastomeric, and increase the attenuation of acoustic energy. Coupling agents such as those having titanate, zirconate, or silane chemistries, are also preferably added to help the epoxy wet the powder surfaces and to help reduce viscosity.

Also contained in the backing material composition are highly thermally conductive powders such as aluminum nitride and boron nitride, to avoid overheating of the array, and delamination, from the energy of the pulser system used to scan the array beam in medical scanning. These powders function to siphon heat from the array, and may be used in combination with a metal heat sink 25, (See FIG. 5) in immediate proximity to the backing 24 of the array, in the array housing 26. This is particularly important in high energy density scanning modes such as Doppler, or Color Flow Doppler.

A preferred backing material composition for a single layer backing material contains about 50 to about 60% by weight of a mixture of thermally conductive powders and heavy powders, about 25 to about 39% by weight epoxy resin, 0 to about 25% by weight liquid polysulfide, 0 to about 5% by weight phenolic shell micro-balloons, and 0 to about 0.5% by weight of a coupling agent. A particularly preferred embodiment contains about 55% by weight of a mixture of thermally conductive powders and heavy powders, 31% by weight epoxy resin, about 11% by weight liquid polysulfide, about 2.5% by weight phenolic shell micro-balloons, and about 0.5% by weight of a coupling agent.

Figure 6:
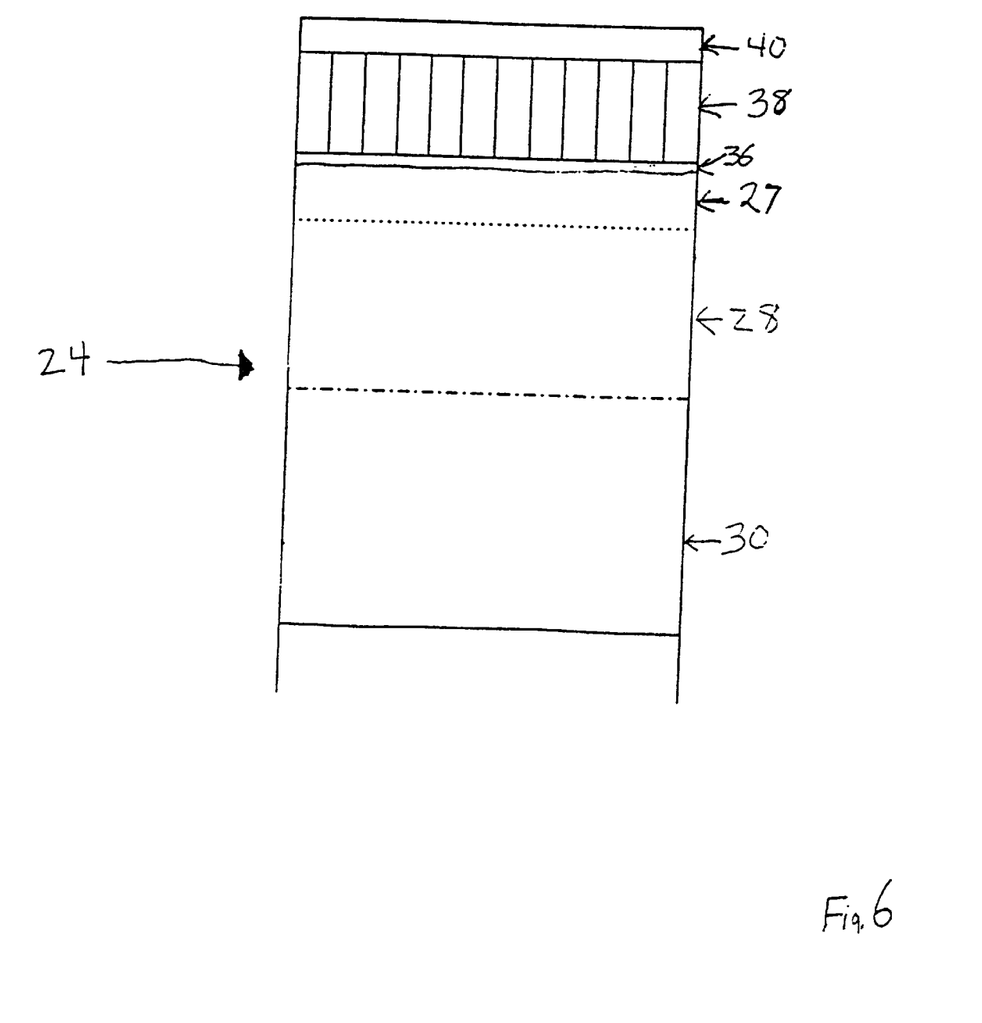
FIG. 6 is a schematic view of multilayer backing for use with the present. invention.

In another preferred embodiment of the invention, as shown in FIG. 6, the backing material 24 comprises two or more layers of different backing material compositions in order to form a multi-staged backing with the desirable properties of mechanical rigidity and support, as well as the necessary acoustic absorbance required. The hardness and sound absorbance is varied by altering the weight percentage of liquid polysulfide and phenolic micro-balloons.

A first layer 27 is designed to achieve stiffness and mechanical support. A second (middle) layer 28, which is in contact with the first layer, is designed for maximum sound absorbance. A third layer 30, which is in contact with the second layer, is designed for stiffness and mechanical support. Each layer generally contains a backing material composition as described above, but adjusted to achieve the above properties and so that the first and third layers are more rigid than the second layer. If desired, only two layers, namely the first and second layers, can be used, or additional layers can be included. To achieve the desired properties, preferably the second layer 28 contains plasticizer and phenolic shell micro-balloons so that these two components are each present in the second layer in amounts greater than in the first and third layers. It is not necessary for the first and third layers to contain any plasticizer and/or phenolic shell micro-balloons at all, although these components may be included in the first and third layers if desired.

Preferably the first layer 27 is from about 0.5 to about 2.0 mm thick, has a Shore A hardness of ranging from about 50 to about 90, contains from about 0 to about 10% by weight liquid polysulfide and from about 0 to about 2% by weight phenolic shell micro-balloons. In a particularly preferred embodiment, the first layer is about 1.0 mm thick, has a Shore A hardness of about 70, and contains about 8% by weight liquid polysulfide and no phenolic shell micro-balloons.

Preferably, the second layer 28 is about 7 to about 18 mm thick, has a Shore A hardness ranging from about 40 to about 80, and contains from about 15 to about 25% by weight liquid polysulfide and from about 0 to about 5% by weight phenolic shell micro-balloons.

Preferably, the third layer 30 is from about 5 to about 15 mm thick, has a Shore A hardness ranging from about 80 to about 90, and contains no liquid polysulfide or phenolic shell micro-balloons.

Additional layers may be added for either mechanical support or additional acoustic absorbance. Layers designed for acoustic absorbance typically contain more micro-balloons and more liquid polysulfide than the other less acoustically absorbent, or mechanically stiffer, layers. Likewise, layers designed to achieve mechanical support and rigidity, would contain less micro balloons and would contain less liquid polysulfide than the acoustically absorbent, and typically softer layers.

The multi-staged backing 24 is made by pouring successive layers of different material into the mold cavity 21. In one embodiment of the invention each different layer is poured in and allowed to cure before the next layer is poured in on top of it. In one embodiment, curing time for each layer is 6 to 72 hours. In a preferred embodiment the curing time is 24 to 48 hours.

In another embodiment, each layer is poured in on top of the previous layer before significant curing has taken place, typically within 15 minutes. This preferred method leads to more acoustically invisible boundaries. After all of the layers have been added, the backing 24 is allowed to cure for 4 to 48 hours.

Figure 7:
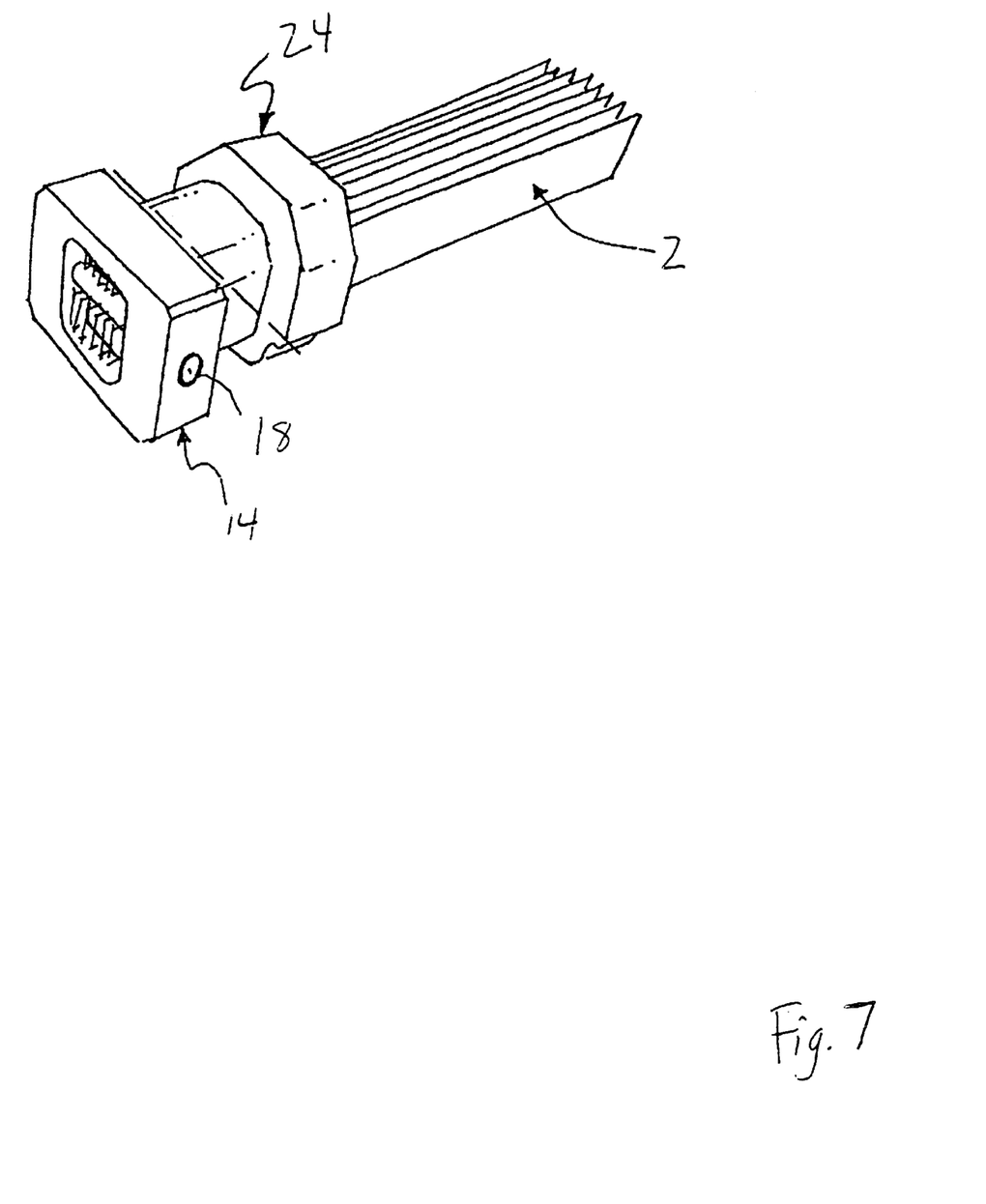
FIG. 7 is a perspective view showing the bottom of the plug circuits after they have been removed from the mold, but before the tooling has been cut off to expose the electrical leads.
Figure 8:
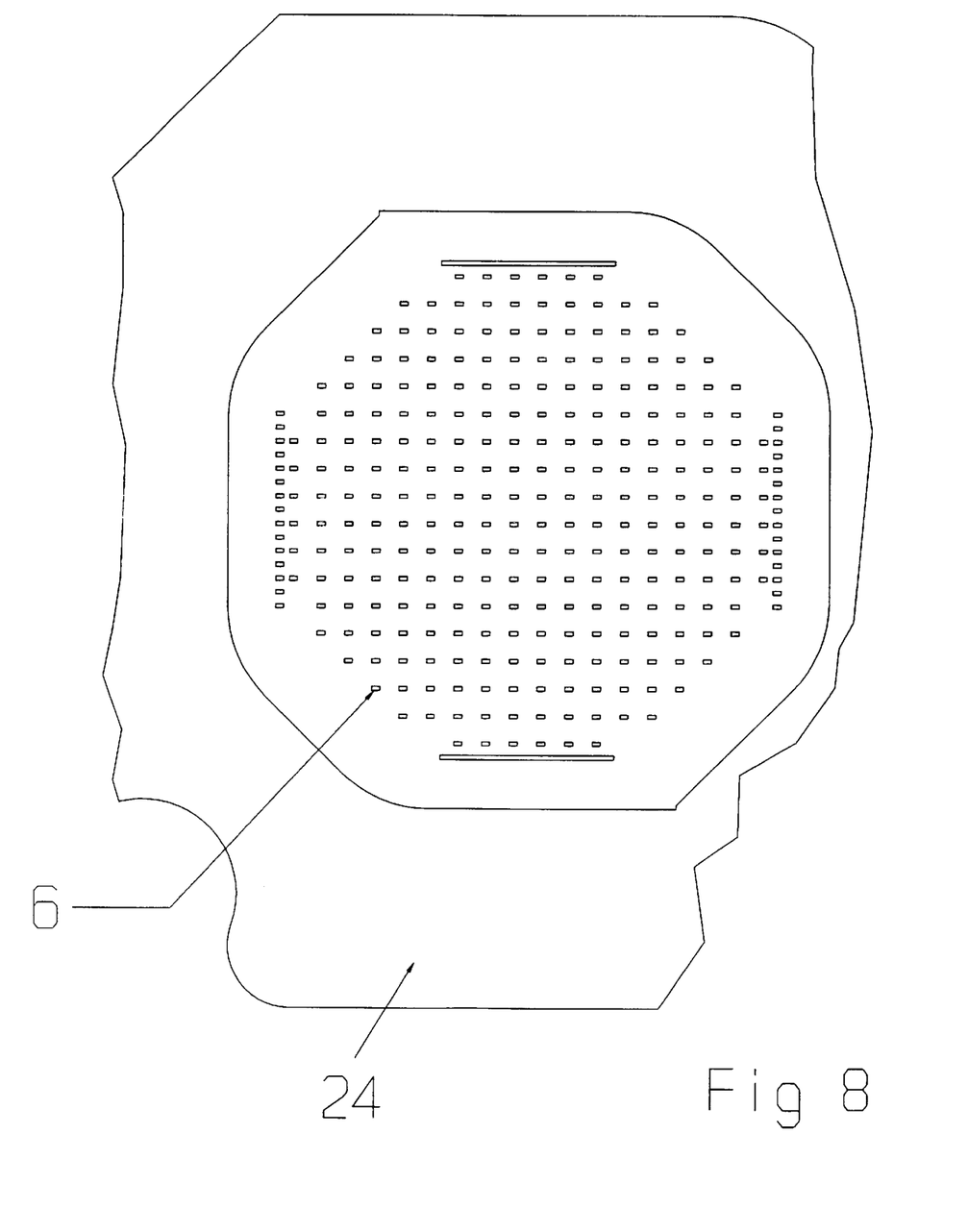
FIG. 8 is a bottom view of the cut backing material with the exposed electrical leads.

The fourth step in the process is the removal of the mold 12 and the cutting of the backing material 24, as depicted in FIG. 7. Once curing is complete, the mold 12 is removed from the backing material 24. The plug circuits 2 are now embedded in and continue through the backing material 24 into the alignment tooling 14. The alignment tooling 14 and the bottom "U" shaped section 8 of each plug circuit 2 is removed and the electrical leads 6 are exposed, by cutting the backing material 24 at a point above the alignment tooling 14, using a saw. The backing material 24 is then ground flat using a surface grinder and lapped. FIG. 8 shows the exposed plug circuit leads 6 after cutting the backing material 24, and then grinding and lapping the surface.

In an alternate embodiment of the invention another step may be performed here called ditch dicing. Ditch dicing enhances the connection between the electrical leads 6 and the later added piezoelectric elements 32. Ditches are cut around the electrical leads 6 in the backing material 24 to expose the sides of the electrical leads 6. The ditches are filled with a suitable electrically conducting adhesive 34 during the later bonding of a piezoelectric 32 to the backing material 24.

Figure 9:
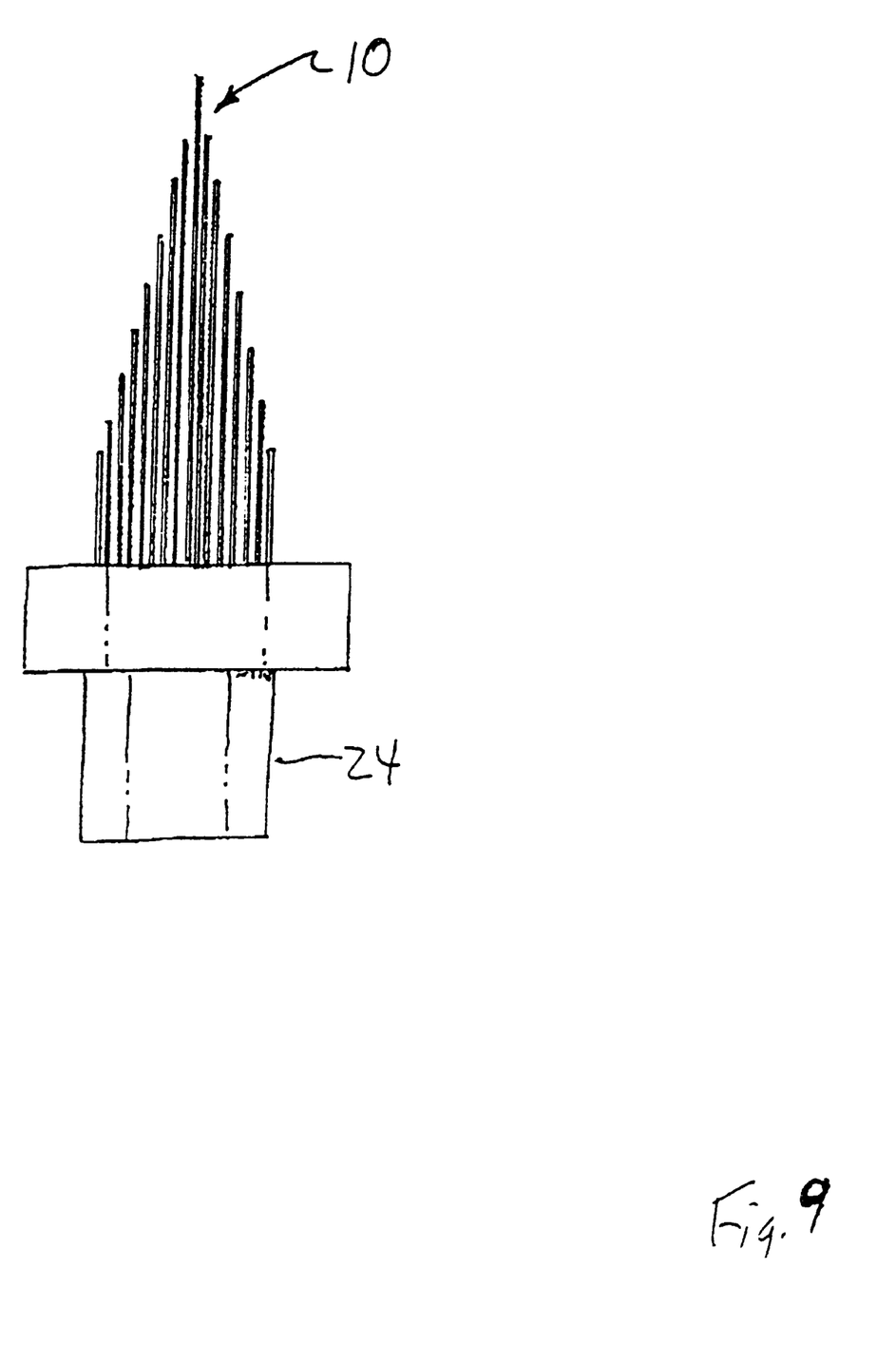
FIG. 9 is a side view of the plug circuits in the backing material.

Also at this time, as depicted in FIG. 9, the top ends of the plug circuits 2 are trimmed just above their windows 10 from highest on the center plug circuit to lower on the plug circuits 2 toward the edges to form staggered height levels forming a point in the center for easier connection to other equipment. This staggered geometry of the plug circuits 2 allows for compact attachment to a cable bundle assembly, thus allowing for the use of a very small, streamlined handle, for easy hand held use in medical scanning.

The fifth step in the process is the attachment of a piezoelectric material 32 to the backing material 24. The piezoelectric 32, may be piezoelectric ceramic material type PZT-5H. In another embodiment, the array may utilize ceramic piezoelectric plates with dielectric constants ranging from about 3000 to about 6500. Another embodiment may utilize multi-layer ceramics, with interconnecting electrodes brought out to the edges of the array, to achieve higher capacitance.

The electrical leads 6 and piezoelectric 32 are coated with a primer or adhesion promoting chemical such as a titanate, zirconate, or silane based primer. The block of piezoelectric 32 is then bonded to the face of the backing material 24 with a suitable electrically conductive adhesive 34, such as silver loaded epoxy, like Chomerics Cho-Bond #584, to form a bond line 36. The piezoelectric ceramic 32 may already be coated with a matching layer on the face not adhered to the backing material 24. In a preferred embodiment, the time to achieve the bond between the piezoelectric ceramic 32 and the backing material 24 is from about 48 to 96 hours, and in a particularly preferred embodiment the time to achieve the bond is about 72 hours.

Figure 10:
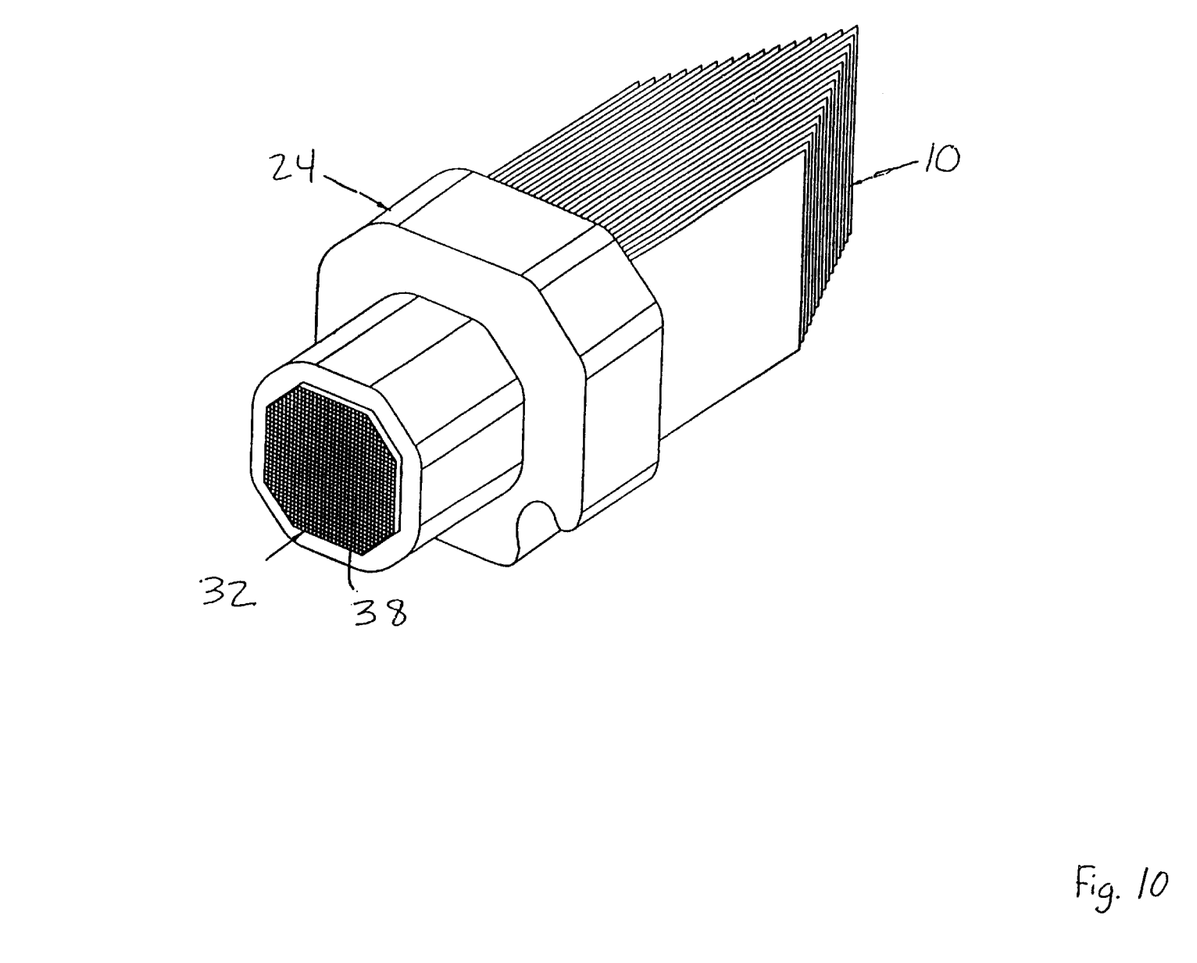
FIG. 10 is a perspective view showing the bottom of the array after the piezoelectric ceramic has been bonded to the backing material.

The sixth step in the process is the formation of discrete piezoelectric ceramic elements 38, as shown in FIG. 10. A dicing saw is used to cut through the block of piezoelectric ceramic 32 into the backing material 24 to form discrete piezoelectric ceramic elements 38. In another embodiment, sub-dicing may be performed to limit undesirable acoustic properties in the array. Sub-dicing is performed by cutting each element 38 into quadrants with an additional horizontal and an additional vertical cut. Thus, in a sub-diced array, each electrical lead 6 is attached to four separate pieces of piezoelectric material 32.

In a preferred embodiment, this operation is performed by a Micro-Automation or K&S dicing saw. Ideally the dicing saw will have precision stepping motors and table travel in a computer aided system to achieve accurate dicing. The dicing saws cut all the way through the piezoelectric ceramic 32 into the backing material 24 to a depth approximately equal to the thickness of the piezoelectric ceramic 32. The depth cut into the backing material 24 may be varied depending on the acoustic properties desired and the piezoelectric ceramic 32 used.

Figure 11:
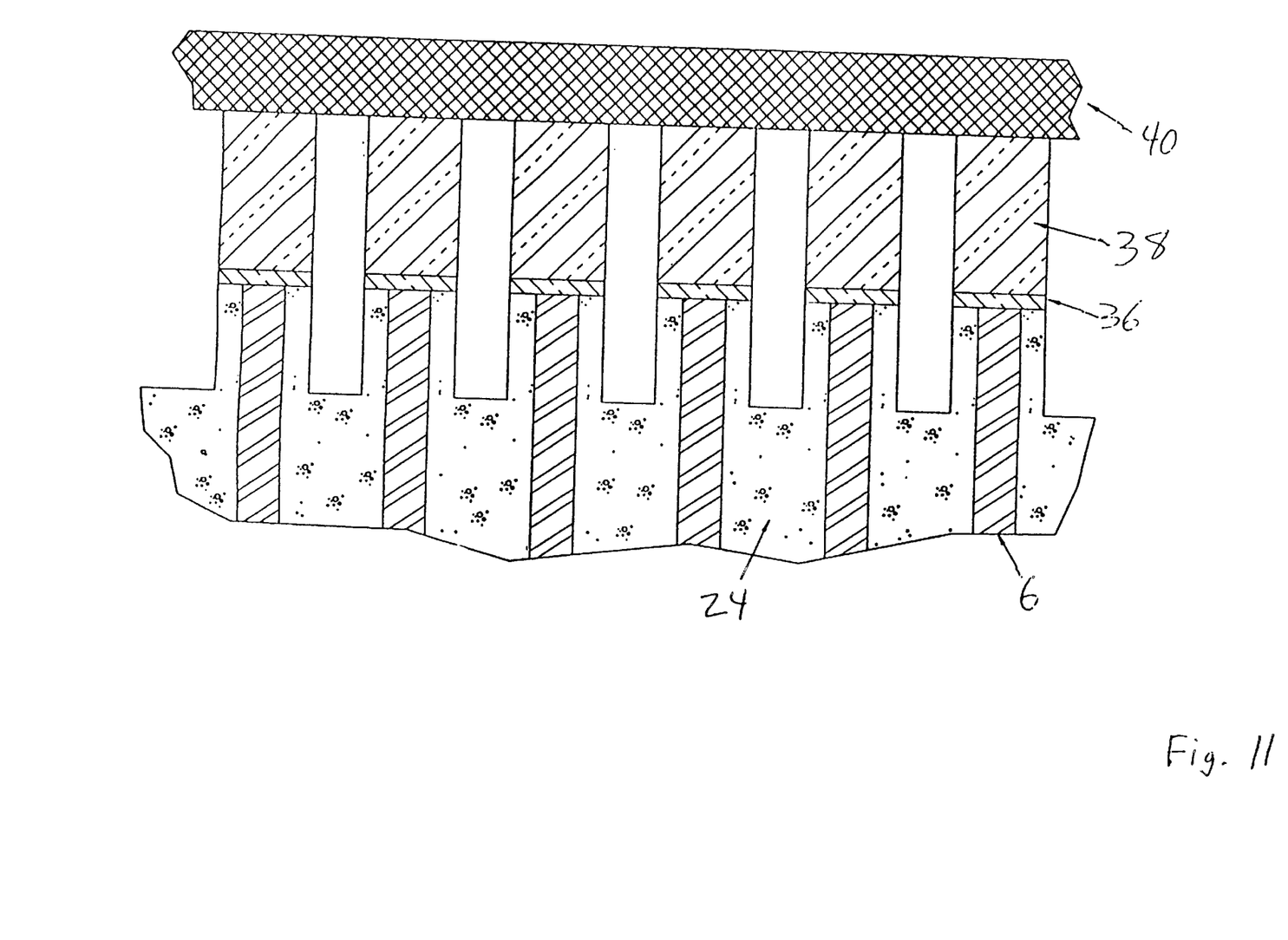
FIG. 11 is a cross-sectional view of the array after the piezoelectric ceramic has been diced and the matching layer has been bonded to the top of the array.

The seventh step in the process is the attachment of a matching layer 40 to the piezoelectric ceramic elements 38 as shown in FIG. 11. The matching layer 40 is bonded to the exposed side of the piezoelectric ceramic elements 38. The piezoelectric elements 38 are coated with a primer or adhesion promoting chemical such as a titanate, zirconate, or silane based primer. The matching layer 40 can be a layer of silver epoxy such as Chomerics Cho-Bond #584. Multiple matching layers may be used to impart desirable acoustic properties to the array. Metalized foil or aluminum may be used for better electrical conduction, or Rf shielding. The matching layer is cured to the piezoelectric elements from 24 to 72 hours.

The matching layer 40 is carefully folded over the sides of the piezoelectric ceramic elements 38 and sealed to the backing material 24. Thus, the matching layer 40 seals the piezoelectric ceramic elements 38, leaving air insulating the space between each piezoelectric ceramic element 38. Besides air, the piezoelectric ceramic element kerfs can be insulated with other insulators having desirable acoustic properties. One end of each piezoelectric ceramic element 38 is supported by the backing material 24, and the other end is supported by the matching layer 40, thereby supporting each piezoelectric ceramic element 38 in a predetermined spacial relationship and in electrical contact with an electrical lead 6 of a plug circuit 2.

Figure 12:
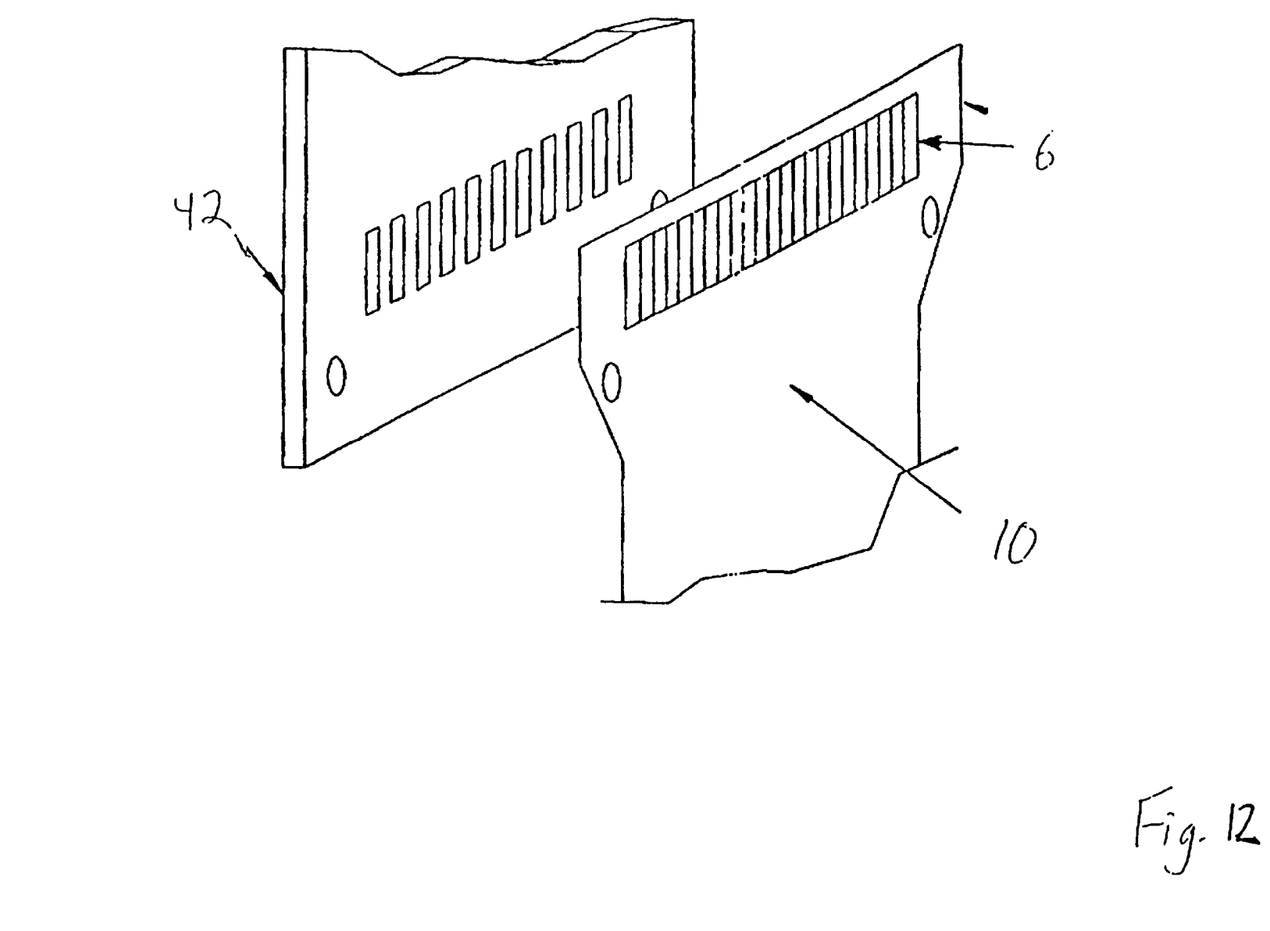
FIG. 12 is a perspective view showing how the top of a plug circuit is aligned with a cable attachment board.

The eighth step in the process is the attachment of the ultrasonic array to other equipment as shown in FIG. 12. The interconnect cable, to which the array will be attached, contains hard printed circuit boards 42, which will mate to the plug circuits 2. The window 10 of each plug circuit 2 is attached to a cable 42 by matching up each desired electric element 6 in the plug circuit 2 to the corresponding trace on the printed circuit board 42 of the cable being attached, and then bonding the two together. In bonding the plug circuit 2 to the cable 42, a standard tin-lead solder may be used.

Figure 5:
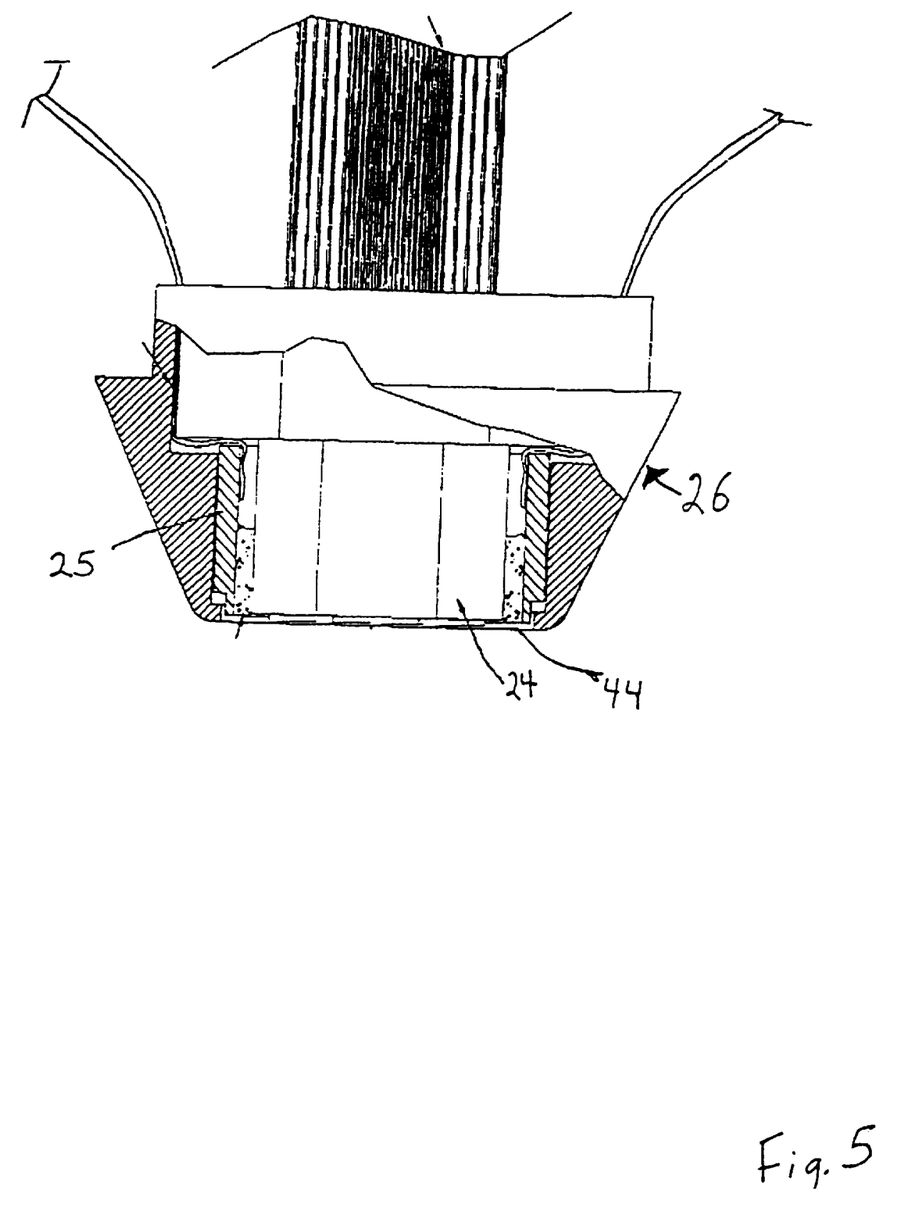
FIG. 5 is a cross-sectional view of the array after it has been placed in a housing.

The ultrasonic array is placed in a housing (See FIG. 5). The ultrasonic array is secured in the housing using a suitable adhesive, such as silver loaded epoxy. Silver loaded epoxy conducts heat away from the backing 24 to the metal heat sink 25. The housing has an outer faceplate 44 that sits between the ultrasonic array and the object being analyzed. In one embodiment, the outer faceplate 44 is RTV silicone rubber, such as GE RTV-630. In another embodiment the outer faceplate is a urethane material that has a good acoustic impedance match to body tissue, such as Conap EN-7.

The preceding description has been presented with reference to the presently preferred embodiment of the invention shown in the drawings. Workers skilled in the art and technology to which this invention pertains will appreciate that alterations and changes in the described structures can be practiced without departing from the spirit, principles and scope of this invention.

Accordingly, the foregoing description should not be read as pertaining only to the precise structure described, but rather should be read consistent with, and as support for the following claims.

What is claimed is:

1. A multilayer backing for an ultrasonic transducer array comprising:
    a first layer formed from a first composition comprising an epoxy resin base and a powder;
    a second layer in contact with the first layer, wherein the second layer is formed from a second composition comprising an epoxy resin base, a powder, and at least one of a phenolic shell micro-balloon and a plasticizing agent,
    wherein the first layer is more rigid than the second layer.

2. A multilayer backing according to claim 1, wherein the second composition comprises a phenolic shell micro-balloon and a plasticizing agent.

3. A multilayer backing according to claim 1, wherein the first composition further comprises a plasticizing agent and further wherein the second composition comprises the plasticizing agent in an amount greater than the amount of plasticizing agent in the first composition.

4. A multilayer backing according to claim 1, further comprising a third layer in contact with the second layer, wherein the third layer is formed from a third composition comprising an epoxy resin base and a powder, and wherein the third layer is more rigid than the second layer.

5. A multilayer backing according to claim 4, wherein the third composition further comprises a plasticizing agent and further wherein the second composition comprises the plasticizing agent in an amount greater than the amount of plasticizing agent in the third composition.

6. The multilayer backing of claim 4 wherein the third layer has a Shore A hardness of about 80 to about 90.

7. The multilayer backing of claim 4 wherein the third composition comprises about 0 to about 5 percent by weight polysulfide in a substantially liquid form.

8. The multilayer backing of claim 1 wherein the first layer has a Shore A hardness of about 50 to about 90.

9. The multilayer backing of claim 1 wherein the first layer has a Shore A hardness of about 65 to about 75.

10. The multilayer backing of claim 1 wherein the second layer has a Shore A hardness of about 40 to about 80.

11. The multilayer backing of claim 1 wherein the powder in at least one of the first composition and the second composition comprises a heavy powder.

12. The multilayer backing of claim 11, wherein the heavy powder is selected from the group consisting of tungsten and metal oxides.

13. The multilayer backing of claim 1 wherein the plasticizing agent comprises liquid polysulfide.

14. The multilayer backing of claim 1 wherein at least one of the first composition and the second composition further comprises a coupling agent.

15. The multilayer backing of claim 14 wherein the coupling agent comprises at least one composition selected from the group consisting of titanate, zirconate, and silane.

16. The multilayer backing of claim 1 wherein at least one of the first composition and the second composition further comprises a thermally conductive powder.

17. The multilayer backing of claim 16 wherein the thermally conductive powder comprises at least one composition selected from the group consisting of aluminum nitride and boron nitride.

18. The multilayer backing of claim 1 wherein the first composition further comprises about 0 to about 10 percent by weight polysulfide in a substantially liquid form.

19. The multilayer backing of claim 1 wherein the second composition further comprises about 15 to about 25 percent by weight polysulfide in a substantially liquid form.

20. The multilayer backing of claim 1 wherein the second composition comprises about 0 to about 5 percent by weight phenolic shell micro-balloons.

* * * * *